US006339617B1

(12) United States Patent
Ueda

(10) Patent No.: US 6,339,617 B1
(45) Date of Patent: Jan. 15, 2002

(54) MOVING PICTURE COMPRESSING APPARATUS AND MOVING PICTURE COMPRESSING METHOD

(75) Inventor: Hiroaki Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/211,028

(22) Filed: Dec. 14, 1998

(30) Foreign Application Priority Data

Dec. 19, 1997 (JP) .............................................. 9-350772

(51) Int. Cl.[7] .................................................. H04N 7/12
(52) U.S. Cl. .................... 375/240.16; 348/699; 348/700
(58) Field of Search ....................... 375/240.16, 240.13, 375/240.12, 240.2, 240.18; 348/400.1, 416.1, 699, 700; 382/236, 238, 248; 386/111; 358/261.2, 430

(56) References Cited

U.S. PATENT DOCUMENTS

| 5,493,345 | A | * | 2/1996 | Ishikawa et al. ............. 348/700 |
| 5,602,594 | A | * | 2/1997 | Cho et al. .................... 348/419 |
| 5,724,100 | A | * | 3/1998 | Kuchibhotla ................ 348/420 |
| 5,801,765 | A | * | 9/1998 | Gotoh et al. ................. 348/155 |
| 6,057,893 | A | * | 5/2000 | Kojima et al. .............. 348/700 |
| 6,028,691 | A1 | * | 3/2001 | Balakrishnan et al. . 375/240.12 |

FOREIGN PATENT DOCUMENTS

| JP | 2-174387 | 7/1990 |
| JP | 3-13792 | 1/1991 |
| JP | 6-30409 | 2/1994 |
| JP | 6-46411 | 2/1994 |
| JP | 7-38895 | 2/1995 |
| JP | 7-107483 | 4/1995 |
| JP | 8-56361 | 2/1996 |
| JP | 9-23427 | 1/1997 |
| JP | 9-200769 | 7/1997 |

* cited by examiner

Primary Examiner—Vu Le
(74) Attorney, Agent, or Firm—Ostrolenk, Faber, Gerb & Soffen

(57) ABSTRACT

Disclosed is a moving picture compression apparatus for performing intra-frame or inter-frame compression every block in frames in a moving picture, which comprises: means for detecting scene change in a moving picture; means for generating code containing information on components in a transformed domain's range gradually extending as the picture advances for a block in a new scene portion of a frame at the scene change detection during plural frames from the frame at the scene change detection, wherein the information is obtained by compressing the block in the new scene portion with the intra-frame compression process in the first frame from the scene change detection, and the information is obtained by compressing the block in the new scene portion with the inter-frame compression process in the second and following frames from the scene change detection.

8 Claims, 15 Drawing Sheets

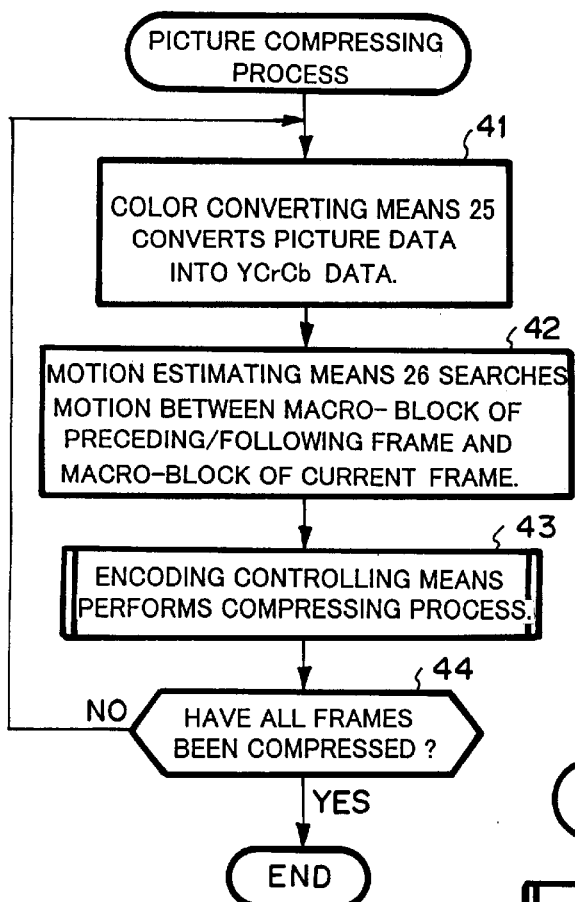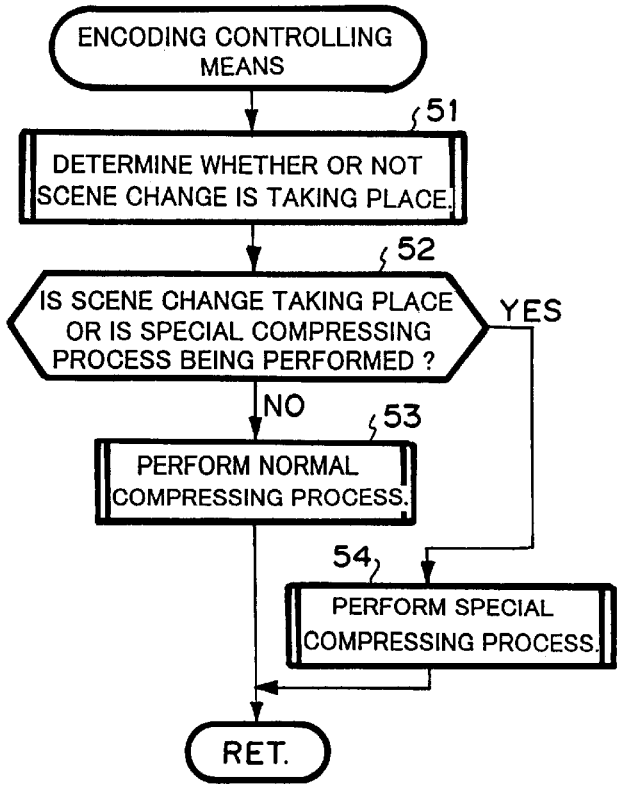

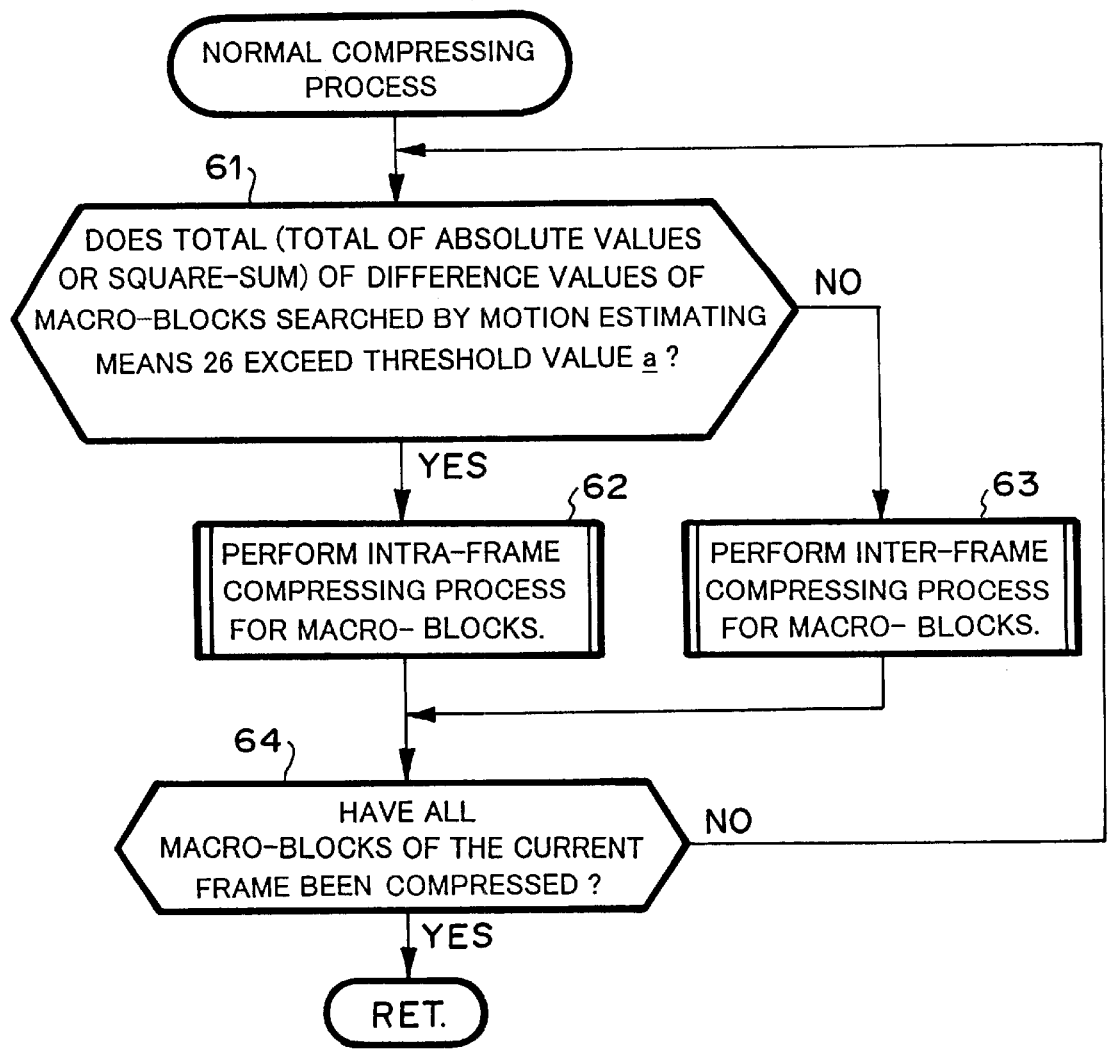

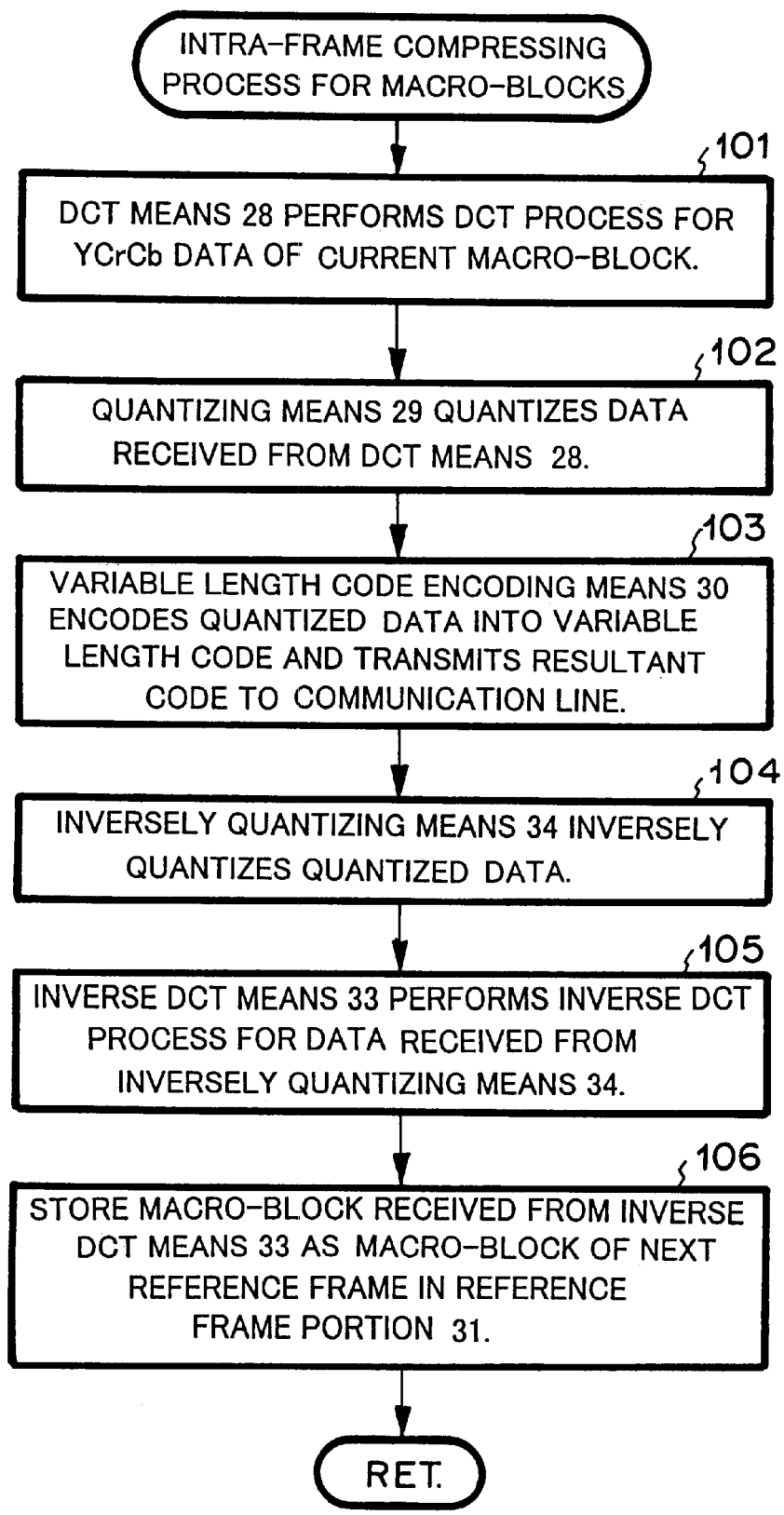

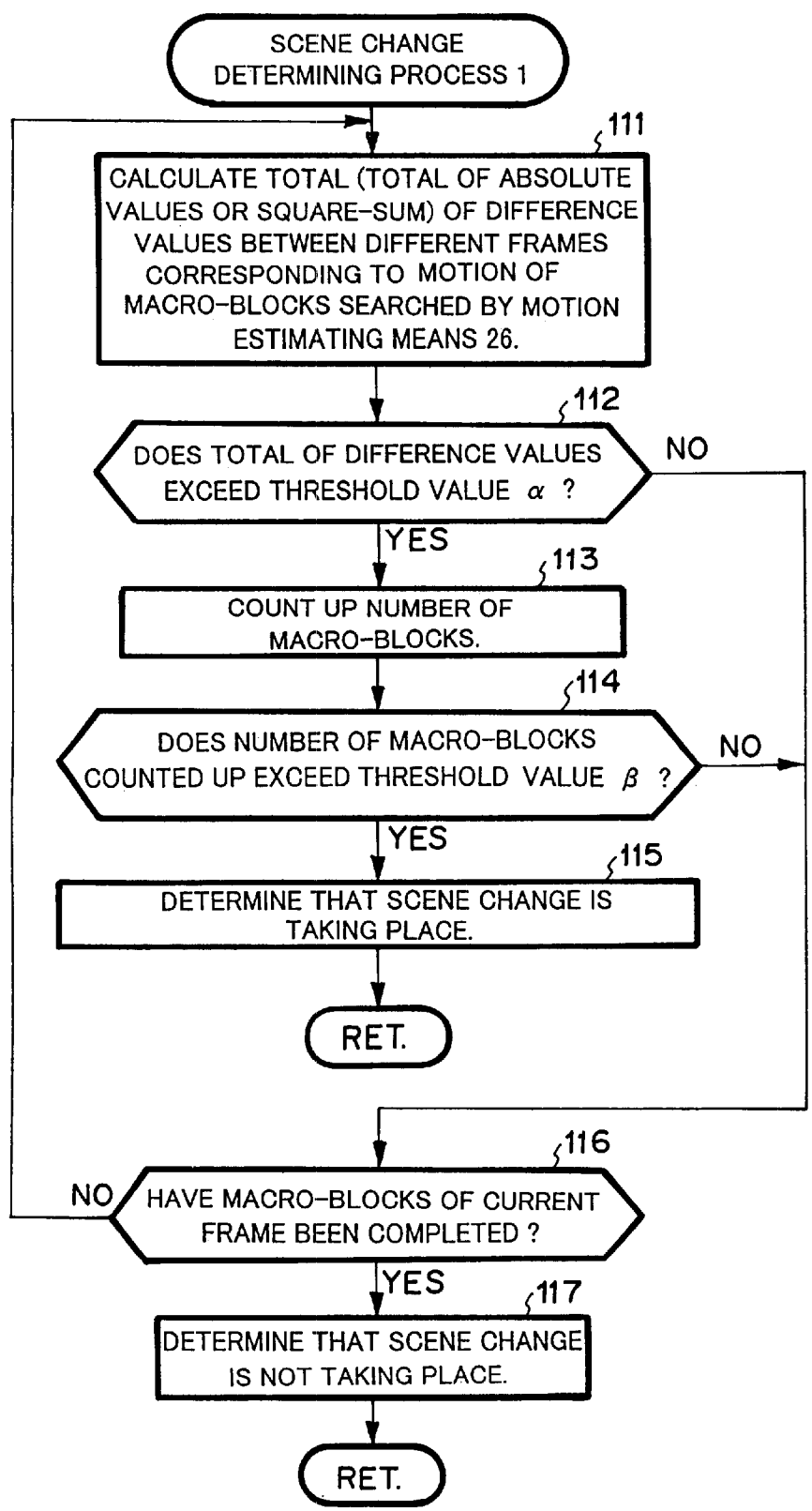

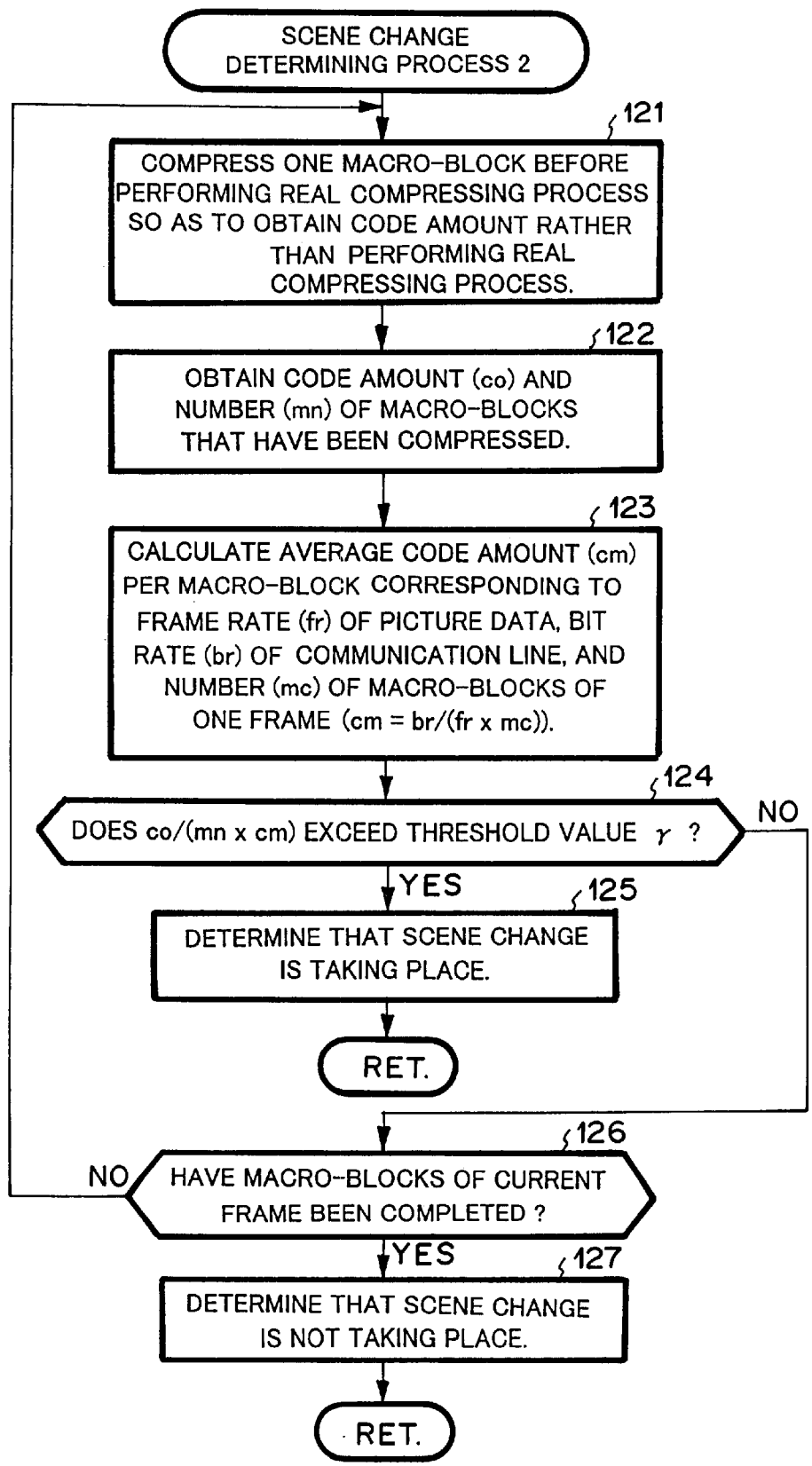

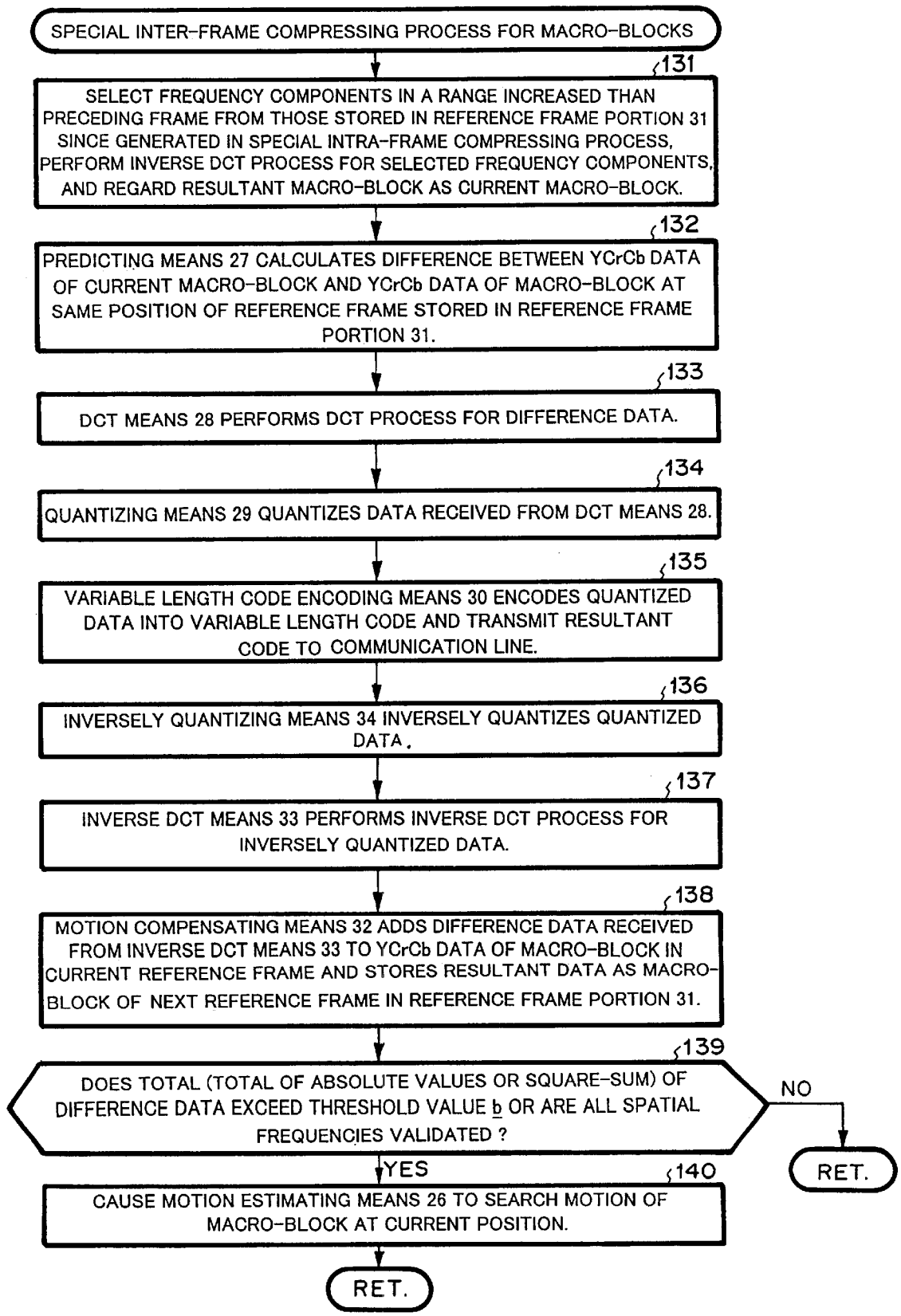

FIG. 7A

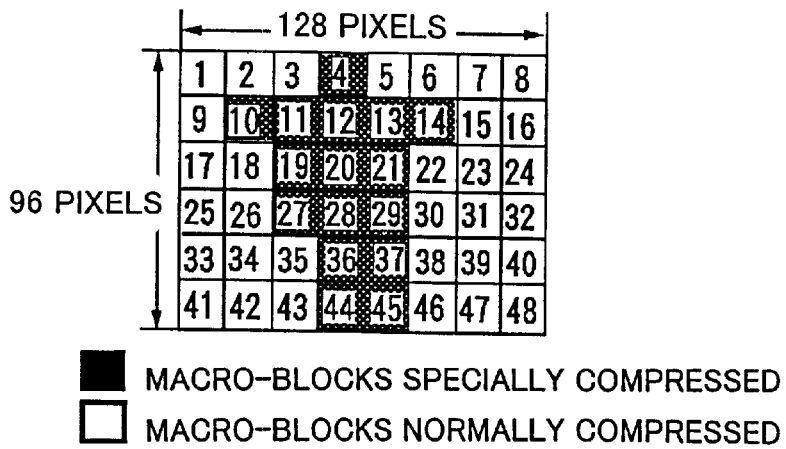

■ MACRO-BLOCKS SPECIALLY COMPRESSED
☐ MACRO-BLOCKS NORMALLY COMPRESSED

EXAMPLE OF DISTRIBUTION OF MACRO-BLOCKS
NORMALLY/SPECIALLY COMPRESSED

FIG. 7B

EXAMPLE OF VALID FREQUENCY COMPONENTS

FIRST FRAME: 0-TH TO 14-TH FREQUENCY COMPONENTS ARE VALID.

SECOND FRAME: 0-TH TO 28-TH FREQUENCY COMPONENTS ARE VALID.

THIRD FRAME: 0-TH TO 53-RD FREQUENCY COMPONENTS ARE VALID.

FOURTH FRAME: 0-TH TO 63-RD FREQUENCY COMPONENTS ARE VALID.

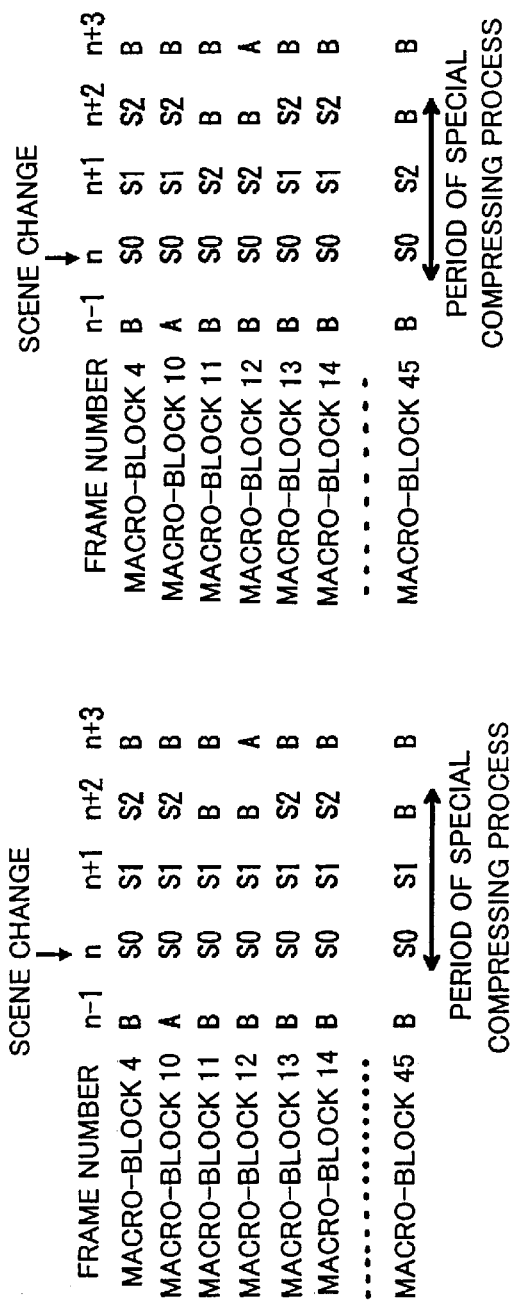

EXAMPLE 1 OF MACRO-BLOCKS SPECIALLY COMPRESSED UPON OCCURRENCE OF SCENE CHANGE

EXAMPLE 2 OF MACRO-BLOCKS SPECIALLY COMPRESSED UPON OCCURRENCE OF SCENE CHANGE

A: NORMAL INTRA-FRAME COMPRESSED CODES: 0-TH TO 63-RD SPATIAL FREQUENCY COMPONENTS ARE VALIDATED.
B: NORMAL INTER-FRAME COMPRESSED CODES: 0-TH TO 63-RD SPATIAL FREQUENCY COMPONENTS ARE VALIDATED.
S0: SPECIAL INTRA-FRAME COMPRESSED CODES: 0-TH TO 14-TH SPATIAL FREQUENCY COMPONENTS ARE VALIDATED.
S1: SPECIAL INTER-FRAME COMPRESSED CODES: 0-TH TO 28-TH SPATIAL FREQUENCY COMPONENTS ARE VALIDATED.
S2: SPECIAL INTER-FRAME COMPRESSED CODES: 0-TH TO 53-RD SPATIAL FREQUENCY COMPONENTS ARE VALIDATED.

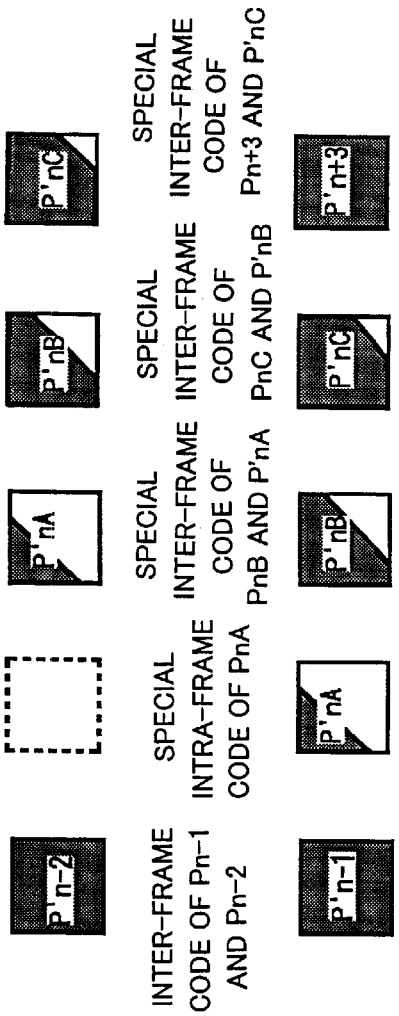

FIG. 8A BLOCK OF ORIGINAL FRAME

FIG. 8B BLOCK FROM WHICH HIGHER-FREQUENCY COMPONENTS ARE DELETED

FIG. 8C BLOCK IN REFERENCE FRAME

FIG. 8D CODE OF BLOCK

FIG. 8E BLOCK REPRODUCED ON REPRODUCING SIDE

Pix: MACRO-BLOCK IN i-TH FRAME
P'ix: MACRO-BLOCK THAT BECOMES REFERENCE FRAME IN i-TH FRAME OR MACRO-BLOCK OBTAINED BY DECODING CODE IN i-TH FRAME
WHEN X IS A: 0-TH TO 14-TH SPATIAL FREQUENCY COMPONENTS ARE VALIDATED.
WHEN X IS B: 0-TH TO 28-TH SPATIAL FREQUENCY COMPONENTS ARE VALIDATED.
WHEN X IS C: 0-TH TO 53-RD SPATIAL FREQUENCY COMPONENTS ARE VALIDATED.
WHEN X IS ABSENT: 0-TH TO 63-RD SPATIAL FREQUENCY COMPONENTS ARE VALIDATED.

ONE OR MORE GOPS

VIDEO SEQUENCE

ONE OR MORE PICTURES

GOP (Group Of Picture)

ONE OR MORE SLICES

PICTURE

ONE OR MORE MACRO-BLOCKS

SLICE

SIX BLOCKS

MACRO-BLOCKS

LUMINANCE COMPONENTS   COLOR DIFFERENCE COMPONENTS

8 X 8 PIXELS

BLOCK

US 6,339,617 B1

MOVING PICTURE COMPRESSING APPARATUS AND MOVING PICTURE COMPRESSING METHOD

BACKGROUND OF THE INVENTION

1. Field of the Invention

The present invention relates to a moving picture compressing apparatus and a moving picture compressing method and in particular, to a moving picture compressing apparatus and a moving picture compressing method for compression-encoding a picture signal on real time basis corresponding to a compression-encoding system mainly using a discrete cosine transform (DCT) process and a quantizing process.

2. Description of the Prior Art

When picture information is digitized and transmitted to a communication medium such as a telephone line, it is transmitted after it is compressed and encoded since the data amount of the picture information is vast. When a picture is compressed, a DCT encoding system has been widely used. In the DCT encoding system, picture data is compressed using the characteristic that magnitudes of spatial frequencies thereof tend to concentrate on lower spatial frequencies. This system has been adopted in international standards such as MPEG (Moving Picture Experts Group) video and ITU-T Recommendation H.263.

FIGS. 9A, 9B, 9C, 9D, 9E, and 9F are schematic diagrams showing a hierarchy of code formats of MPEG video. FIG. 1A shows a video sequence as the top hierarchical level. The video sequence is composed of a plurality of GOPs (Group of Pictures). Each GOP is composed of a plurality of pictures as shown in FIG. 1B. Each picture represents one frame. Pictures are categorized into three types of pictures that are I picture, P picture, and B picture. The I picture is composed of only intra-frame codes. The P picture is composed of inter-frame codes in forward direction as well as intra-frame codes. The B picture is composed of inter-frame codes in both of forward and backward directions as well as intra-frame code.

Each picture is composed of a plurality of slices arbitrarily divided into areas as shown in FIG. 1C. Each slice is composed of a plurality of macro-blocks arranged rightwardly or downwardly. Macro-blocks are categorized as intra-blocks and inter-blocks. The intra-blocks are composed of intra-frame codes. The inter-blocks are composed of inter-frame codes in forward direction or two directions. The I picture is composed of only intra-blocks. On the other hand, the P picture and B picture are composed of inter-blocks as well as intra-blocks.

Each macro-block is composed of a total of six blocks that are luminance components (Y1, Y2, Y3, and Y4) and two color difference components (Cb and Cr) as shown in FIG. 1E. Each of the six blocks is composed of 8×8 pixels. A block of 8×8 pixels shown in FIG. 1F is the minimum encoding unit.

Next, with reference to FIG. 2, a conventional picture compressing process will be explained. FIG. 10 is a block diagram showing an example of the structure of a conventional picture compressing apparatus. In the apparatus shown in FIG. 10, central processing unit (CPU) 2 executes a program in apparatus controlling means 1 so as to control the whole of the apparatus. A user inputs a desired command to CPU 2 through keyboard 3. Picture data is compression-encoded by picture compressing means 4. The resultant compressed code is transmitted to a communication line.

Picture data is supplied to color converting means 5 in picture compressing means 4. Color converting means 5 converts the picture data into three types of data that are Y, Cr, and Cb (hereinafter referred to as YCrCb data as a whole). A motion estimating means 6 searches a macro-block in the preceding/following frame so that the difference between the macro-block and a macro-block in the current frame becomes the minimum and calculates a motion vector corresponding to the motion between he two macro-blocks. When the difference is small, predicting means 7 calculates the difference between the frames so as to perform the inter-frame compressing process.

Output data of motion estimating means 6 is supplied to DCT means 8 along with the output of predicting means 7. When the intra-frame compressing process is performed, DCT means 8 performs a DCT process for the YCrCb data. When the inter-frame compressing process is performed, DCT means 8 performs the DCT process for the difference data. Thereafter, quantizing means 9 quantizes the resultant data. Next, variable length code encoding means 10 encodes the resultant data into variable length code.

The quantized data that is outputted from quantizing means 9 is supplied to inversely quantizing means 14. Inversely quantizing means 14 inversely quantizes the quantized data. Inverse DCT means 13 performs an inverse DCT process for the resultant data. When the intra-frame compressing process is performed, the resultant data is stored in reference frame portion 11. When the inter-frame compressing process is performed, the difference in the inverse DCT process is added to the macro-block compensated in motion with the motion vector stored in reference frame portion 11. The resultant data is stored in reference frame portion 11.

The picture code that has been compression-encoded on the transmitting side is transmitted to the communication line. The picture to be transmitted need to be compressed in a compression ratio corresponding to the bit rate of the communication line. In particular, when picture data and audio data are transmitted at a low bit rate of 64 kbps used in a TV telephone system, they should be compressed at a high compression rate. Thus, the ratio of inter-frame compressed blocks to intra-frame compressed blocks is increased because code amount of an inter-frame compressed blocks is smaller than that of an intra-frame compressed block.

For example, in the first frame, all macro-blocks are compressed in the intra-frame compressing process. In the second or later frames, all the macro-blocks are compressed in the inter-frame compressing process unless the difference between different frames is large. Thus, the ratio of macro-blocks that are compressed in the intra-frame compressing process is decreased in second or later frames. However, when a scene change takes place, a code amount abruptly increases since the difference between different frames becomes large. Thus, it takes a long time to reproduce frames following a scene change on the reproducing side. Consequently, the picture looks like a still picture.

In order to solve such a problem, various picture compressing apparatuses that effectively compress pictures preceded by a scene change have been proposed in, for example, JPA-8-56361, JPA-2-174387, JPA-7-38895, and JPA-3-13792. In the picture compressing apparatus disclosed in JPA-8-56361, several consecutive frames preceded by a scene change including frames which are originally compressed in the intra-frame compressing process are forcedly compressed in the inter-frame compressing process, so that a code amount is decreased. In the picture compressing apparatus disclosed in JPA-2-174387, the intra-frame encoding process or the inter-frame prediction encoding process is used so that the prediction error becomes minimum and blocks are encoded using codebooks of which each is dedicated for intra-frame encoding process or the inter-frame prediction encoding. In the picture compressing apparatus disclosed in JPA-7-38895, after a scene change, higher-spatial-frequency components of blocks that are compressed in the intra-frame compressing process are deleted. In the picture compressing apparatus disclosed in JPA-3-13792, after a scene change due to a switching operation of a camera, picture data of several frames are sub-sample encoded so as to decrease a code amount generated.

Among the foregoing prior art references, in the picture compressing apparatus disclosed in JPA-8-56361, the ratio of macro-blocks that are compressed in the inter-frame encoding process is increased so as to transmit code at a low bit rate. But, the effect of decreasing a code amount is small. In addition, when data is compressed at a high compression rate in order to reduce a code amount, the picture quality deteriorates. The deteriorated picture does not recover its quality for a long time because it recovers its quality when all of the blocks has been compressed in the intra-frame compression process after deterioration. In the picture compressing apparatus disclosed in JPA-2-174387, the effect is low in case that the ratio of blocks that are compressed in the intra-frame compressing process is originally decreased. In the picture compressing apparatus disclosed in JPA-7-38895, since higher-spatial-frequency components are deleted, the picture quality deteriorates. And the deteriorated picture does not recover its quality until a frame of the picture is compressed in the intra-frame compression process. In the picture compressing apparatus disclosed in JPA-3-13792, a special decoding means is required on the reproducing side.

SUMMARY OF THE INVENTION

In order to overcome the aforementioned disadvantages, the present invention has been made and accordingly has an object to provide a picture compressing apparatus and a picture compressing method in which a code amount of a picture after a scene change is decreased and picture quality is quickly recovered after the scene change even at a low bit rate without need to use a special means on the reproducing side.

According to a first aspect of the present invention, there is provided a moving picture compression apparatus for performing intra-frame or inter-frame compression every block in frames in a moving picture, which comprises: means for detecting scene change in a moving picture; means for generating code containing information on components in a transformed domain's range gradually extending as the picture advances for a block in a new scene portion of a frame at the scene change detection during plural frames from the frame at the scene change detection, wherein the information is obtained by compressing the block in the new scene portion with the intra-frame compression process in the first frame from the scene change detection, and the information is obtained by compressing the block in the new scene portion with the inter-frame compression process in the second and following frames from the scene change detection.

According to a second aspect of the present invention, there is provided a moving picture compression apparatus for performing intra-frame or inter-frame compression every block in frames of a moving picture, which comprises: transforming means for transforming data in space domain to data in transformed domain; inversely-transforming means for transforming the data in the transformed domain to data in the space domain; scene change detecting means for detecting scene change; a first storage for storing the data in the transformed domain; a second storage for storing data used as reference data; a first writing means for writing the data in the transformed domain to the first storage when the scene change is detected; invalidating means for invalidating a part of the data in the transformed domain when the scene change is detected; a second writing means for writing the data obtained by inversely converting data which remains valid among the data in the transformed domain to the second storage as reference data when the scene change is detected; replacing means for replacing data in a current block by replacement data obtained by reading a part of the data in the transformed domain in the first storage and inversely transforming the part of data by using the inversely-transforming means; difference data generating means for generating difference data by subtracting reference data read from the second storage from the replacement data and supplying the difference data to the transforming means; and updating means for updating reference data in the second storage memory by reading reference data from the second storage, adding the output of the inverse transform means to the read reference data to get sum data, and writing the sum data to the second reference storage; wherein the part of the data in the transformed domain read from the first storage by replacing means is increased in range as a picture advances.

The moving picture compression apparatus may further comprises: quantizing means for quantizing the data in the space domain; inversely quantizing means for inversely quantizing the quantized data in the transformed domain to obtain inversely quantized data in the transformed domain which is supplied to the inverse-transforming means; encoding means for coding the quantized data in the transformed domain.

The encoding means may generate a variable length code.

The transformed domain may be spatial frequency domain. According to a third aspect of the present invention, there is provided a moving picture compression method for performing intra-frame or inter-frame compression every block in frames in a moving picture, which comprises steps of: detecting scene change in a moving picture; generating code containing information on components in a transformed domain's range gradually extending as the picture advances for a block in a new scene portion of a frame at the scene change detection during plural frames from the frame at the scene change detection, wherein the information is obtained by compressing the block in the new scene portion with the intra-frame compression process in the first frame from the scene change detection, and the information is obtained by compressing the block in the new scene portion with the inter-frame compression process in the second and following frames from the scene change detection.

These and other objects, features and advantages of the present invention will become more apparent in light of the following detailed description of the best mode embodiment thereof, as illustrated in the accompanying drawings.

BRIEF DESCRIPTION OF DRAWINGS

FIGS. 2A, 2B, and 2C are flow charts for explaining the operations of the picture compressing apparatus shown in FIG. 1 and a picture compressing method according to the present invention;

FIGS. 4A and 4B are flow charts showing examples of the inter-frame compressing process and the intra-frame compressing process shown in FIG. 2C;

FIGS. 5A and 5B are flow charts showing examples of a scene change determining process shown in FIG. 2B;

FIGS. 6A and 6B are flow charts showing examples of a special inter-frame compressing process and a special intra-frame compressing process shown in FIG. 3;

FIGS. 7A, 7B, 7C, and 7D are schematic diagrams for explaining a case that a frame with a scene change is compressed;

FIGS. 8A, 8B, 8C, 8D, and 8E are further schematic diagrams for explaining another case that a frame with a scene change is compressed.

DESCRIPTION OF PREFERRED EMBODIMENTS

Figure 1:
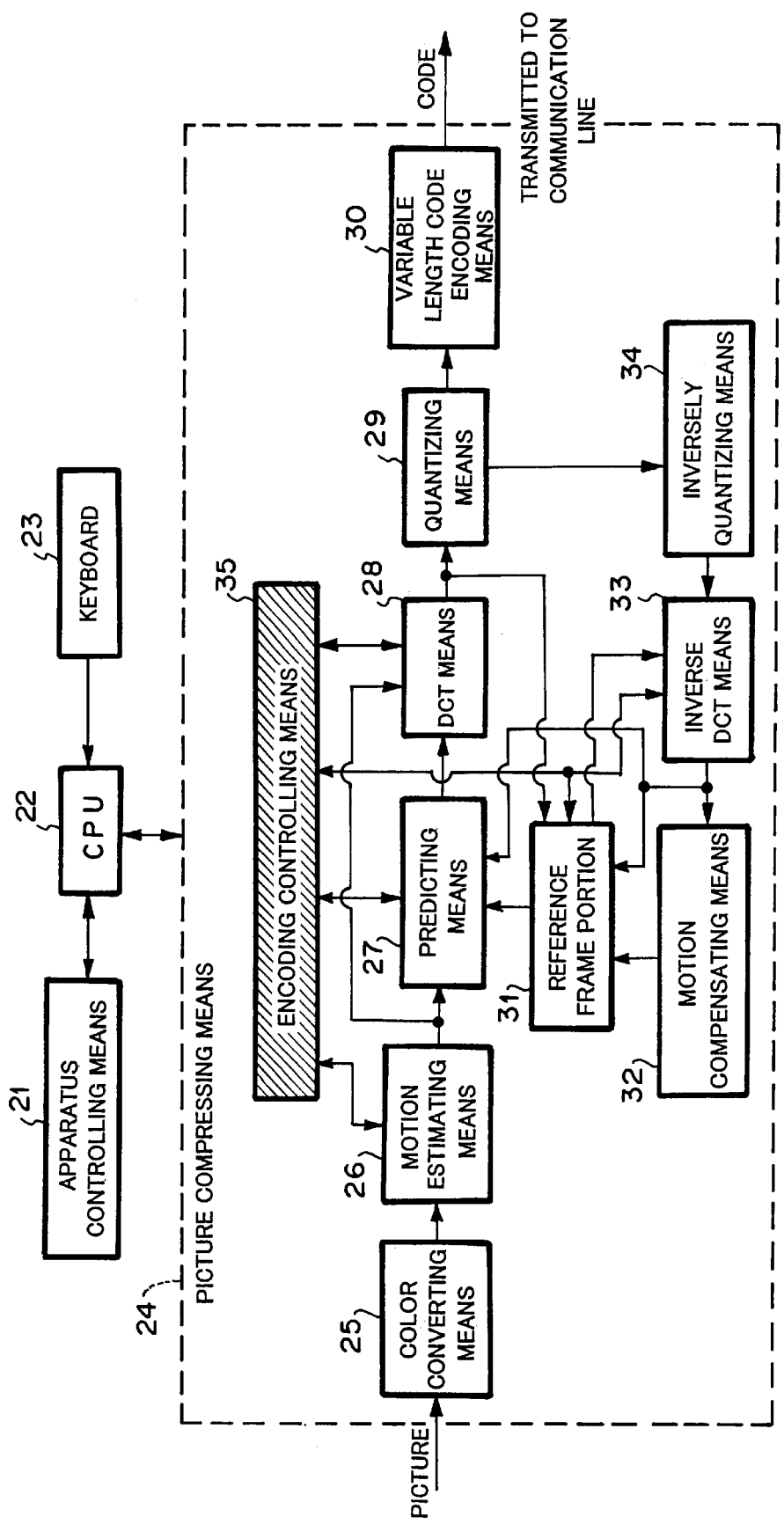
FIG. 1 is a block diagram showing the structure of a picture compressing apparatus according to an embodiment of the present invention.

FIG. 1 is a block diagram showing the structure of a picture compressing apparatus according to an embodiment of the present invention. In FIG. 1, the picture compressing apparatus comprises apparatus controlling means 21, central processing unit (CPU) 22, keyboard 23, and picture compressing means 24. Apparatus controlling means 21 controls the entire apparatus. Central processing unit 22 executes a program. Keyboard 23 inputs a user's command. Picture compressing means 24 compresses a picture.

Picture compressing means 24 comprises color converting means 25, motion estimating means 26, predicting means 27, DCT means 28, quantizing means 29, a variable length code encoding means 30, reference frame portion 31, motion compensating means 32, inverse DCT means 33, inversely quantizing means 34, encoding controlling means 35. Color converting means 25 converts picture data into YCrCb data. Motion estimating means 26 detects a motion vector of each macro-block in a picture. Predicting means 27 calculates the difference between macro-blocks in different frames. DCT means 28 performs a discrete cosine transform (DCT) process as an example of an orthogonal transform process. Quantizing means 29 performs a quantizing process. Variable length code encoding means 30 performs a variable length code encoding process. Reference frame portion 31 stores preceding and following frames referenced to detect a motion of a picture between different frames. Motion compensating means 32 adds the difference between different frames to data in a reference frame. Inverse DCT means 33 performs an inverse DCT process. Inversely quantizing means 34 performs an inversely quantizing process. Encoding controlling means 35 controls motion estimating means 26, predicting means 27, DCT means 28, and inverse DCT means 33 so as to gradually encode higher-spacial-frequency components in a scene change picture.

In the picture compressing apparatus shown in FIG. 1, CPU 22 executes a program in apparatus controlling means 21 so as to control the whole of the apparatus. A user's command is inputted from keyboard 23. Picture compressing means 24 compresses picture data. The compressed code is transmitted to a communication line.

In common with the aforementioned conventional picture compressing apparatus, color converting means 25 in picture compressing means 24 converts input picture data into YCrCb data. Motion estimating means 26 searches a macro-block of a preceding/following frame so that the difference between the macro-block and a macro-block in the current frame becomes the minimum. In addition, motion estimating means 26 calculates a motion vector corresponding to the motion between the two macro-blocks. When the difference is small, predicting means 27 calculates the difference between the frames so as to perform the inter-frame compressing process.

When the intra-frame compressing process is performed, DCT means 28 performs the DCT process for the YCrCb data. When the inter-frame compressing process is performed, DCT means 28 performs the DCT process for the difference data. Quantizing means 29 quantizes frequency components received from DCT converting means 28. Variable length code encoding means 30 encodes the quantized data received from quantizing means 29 into variable length code.

Inversely quantizing means 34 in picture compressing means 24 inversely quantizes the quantized data received from quantizing means 29. Thereafter, inverse DCT means 33 performs an inverse DCT process for the data received from inversely quantizing means 34. When the intra-frame compressing process is performed, the data received from inverse DCT means 33 is stored in reference frame portion 31. When the inter-frame compressing process is performed, a difference value received from inversely DCT means 33 is added to a macro-block compensated in motion by motion compensating means 32 with a motion vector searched from the preceding/following frame and the sum is stored in reference frame portion 11. The resultant data is stored in reference frame portion 31.

When the number of blocks compressed in the intra-frame compressing process increases because of the large difference obtained by motion estimating means 26 or a code amount of a frame largely increases, encoding controlling means 35 in picture compressing means 24 controls motion estimating means 26, predicting means 27, DCT means 28, and inverse DCT means 33 so as to perform the DCT process for only lower-spatial-frequency components in intra-frame encoding blocks or in all the blocks for the first frame, i.e. a scene change frame, and store all the spatial frequency components that have been DCT-processed in reference frame portion 31. Encoding controlling means 35 execute inter-frame encoding in two ways. The first way includes a step of extracting all the spatial frequency components so as to obtain inter-frame encoded blocks or all the blocks for second and later frames after scene change. The second way includes a step of extracting spatial frequency components of a block in a scene change frame in a spatial frequency range extending gradually as a picture advances and performing inverse DCT process for the extracted spatial frequency components so as to obtain a inter-frame encoded blocks until the difference between each of inter-frame encoded blocks and each of locally decoded blocks decreases.

Next, with reference to a flow chart shown in FIG. 2A, a picture compressing process of the picture compressing apparatus according to the embodiment will be explained.

In the picture compressing process, color converting means converts picture data into YCrCb data (at step S41).

Motion estimating means 26 searches the motion between a macro-block of the preceding/following frame and a macro-block of the current frame (at step 42). Encoding controlling means 35 compresses the YCrCb data. Next, apparatus controlling means 21 determines whether or not encoding controlling means 35 has compressed data of all frames (at step 44). When the determined result at step S44 is No, the flow returns to step 41. When the determined result at step 44 is Yes, apparatus controlling means 21 completes the picture compressing process.

Next, with reference to a flow chart shown in FIG. 2B, the compressing process of encoding controlling means 35 will be explained. Encoding controlling means 35 determines whether or not a scene change has taken place (at step 51). Encoding controlling means 35 determines whether a scene change has taken place or a special compressing process is being performed after a scene change (at step 52). When the determined result at step 52 is No, encoding controlling means 35 performs a normal compressing process (at step 53). When the determined result at step 53 is Yes, encoding controlling means 35 performs a special compressing process (at step 54). The special compressing process will be explained later.

Next, with reference to a flow chart shown in FIG. 2C, the normal compressing process will be explained. Encoding controlling means 35 determines whether or not the total (the total of the absolute values or the square-sum) of the difference values between the macro-block searched by motion estimating means 26 and the current macro-block exceeds a threshold value $\underline{a}$ (at step 61). When the determined result at step 61 is Yes, picture compressing means 24 performs the intra-frame compressing process for the current macro-block (at step 62). When the determined result at step 61 is No, picture compressing means 24 performs the inter-frame compressing process for the current macro-block (at step 63).

Next, encoding controlling means 35 determines whether or not all the macro-blocks of the current frame have been compressed (at step 64). When the determined result at step 64 is No, the flow returns to step 61. When the determined result at step 64 is Yes, the picture compressing means 24 completes the normal compressing process. The threshold value $\underline{a}$ is an optimum value that depends on the size of the picture, the frame rate of the picture, the bit rate of the communication line, and the performance of the compressing apparatus.

Next, with reference to a flow chart shown in FIG. 3, the special compressing process at step 54 shown in FIG. 2B will be explained. Encoding controlling means 35 determines whether or not the current frame is the first frame after a scene change (at step 71). When the determined result at step 71 is Yes, encoding controlling means 35 determines whether or not the total (the total of absolute values or the square-sum) of difference values between the macro-block searched by motion estimating means 26 and the current macro-block exceeds the threshold value $\underline{a}$ (at step 72). When the determined result at step 72 is Yes, encoding controlling means 35 performs the special intra-frame compressing process for the current macro-block (at step 73).

As will be explained later, in the special intra-frame compressing process for macro-blocks performed in the first frame after the scene change, higher-spacial-frequency components are deleted. Thus, the code amount of the scene change frame can be decreased.

When the determined result at step S72 is No, encoding controlling means 35 performs the inter-frame compressing process for the current macro-block (at step 74). The inter-frame compressing process will be explained later. After encoding controlling means 35 has completed either the process at step 73 or the process at step 74, encoding controlling means 35 determines whether or not all the macro-blocks of the current frame have been compressed (at step 75). When the determined result at step 75 is No, the flow returns to step 72. When the determined result at step 75 is Yes, encoding controlling means 35 completes the special compressing process.

When the determined result at step 71 is No, encoding controlling means 35 determines whether or not the special intra-frame compressing process has been performed for the first frame after the scene change and in addition motion estimating means 26 has omitted the motion estimating process (at step 76). When the determined result at step 76 is Yes, encoding controlling means 35 performs the special inter-frame compressing process for the current macro-block (at step 77). When the determined result at step 76 is No, encoding controlling means 35 performs the inter-frame compressing process for the current macro-block (at step 78). As will be explained, in the special inter-frame compressing process at steps 73 and 77, encoding controlling means 35 performs the inter-frame compressing process in such a manner that a scene change picture that has more higher-spatial-frequency components than the preceding frame is treated as the next frame. Thus, the picture quality can be quickly restored without requiring to use a special means on the reproducing side.

After encoding controlling means 35 has completed either the process at step 77 or the process at step 78, encoding controlling means 35 determines whether or not all the macro-blocks of the current frame have been compressed (at step 79). When the determined result at step 79 is No, the flow returns to step 76. When the determined result at step 79 is Yes, encoding controlling means 35 determines whether or not the number of macro-blocks that have been compressed in the special inter-frame compressing process is zero (at step 80). When the determined result at step 80 is Yes, apparatus controlling means 21 causes encoding controlling means 35 not to perform the special compressing process from the next frame (at step 81). When the determined result at step 80 is No, encoding controlling means 35 completes the special compressing process.

Figure 3:
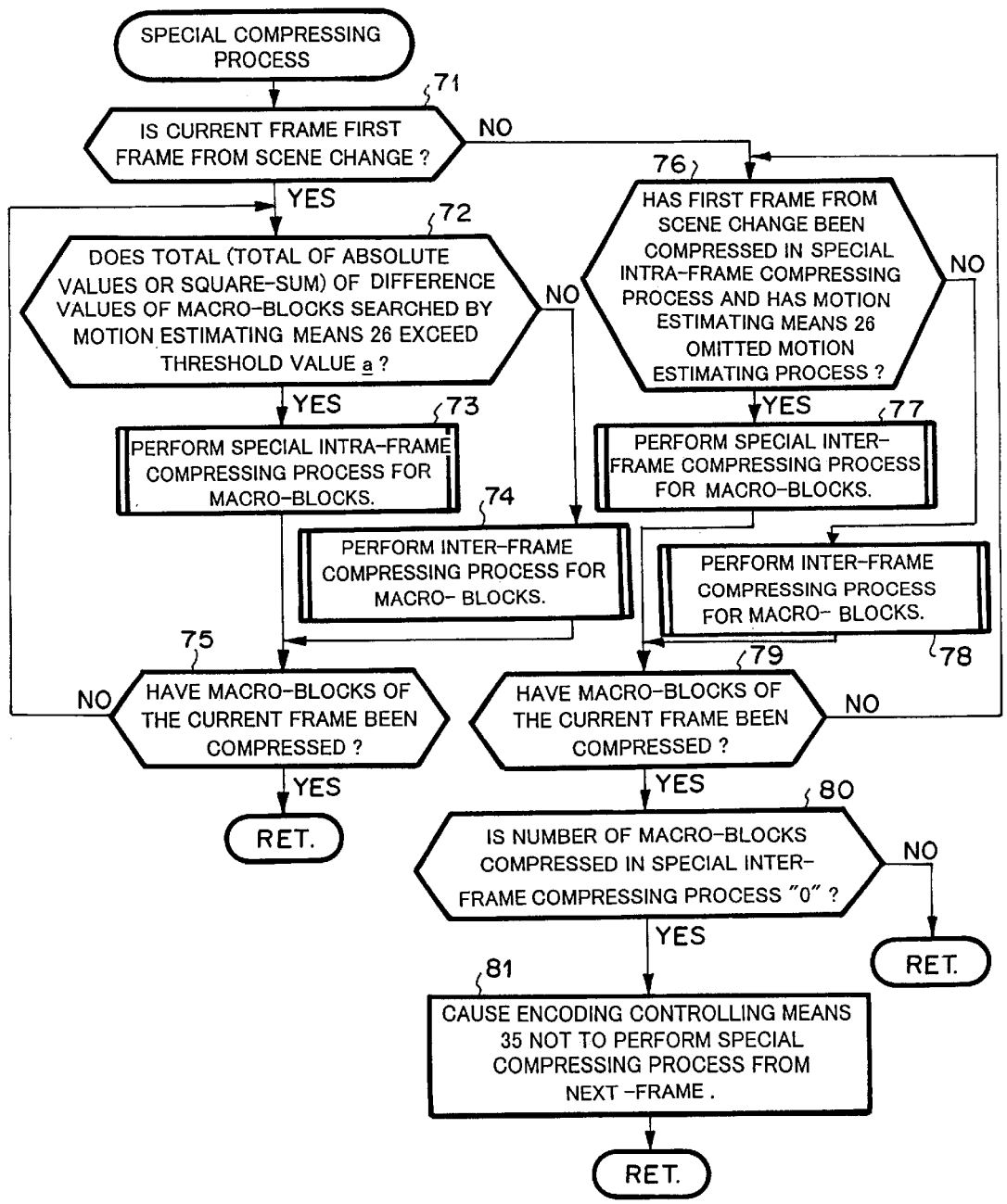
FIG. 3 is a flow chart showing an example of a special compressing process shown in FIG. 2B.

In the special compressing process shown in the flow chart of FIG. 3, macro-blocks in a scene change frame that are compressed in the inter-frame compressing process are compressed in the normal compressing process. However, the quantization step of quantizing means 29 can be increased in order to decrease a code amount. Although the normal compressing process or the special compressing process is selectively performed for each macro-block in the embodiment explained, there is another embodiment in which all the macro-blocks of the first frame after the scene change are compressed in the special intra-frame compressing process and all the macro-blocks in the second and later frames are compressed in the special inter-frame compressing process.

Figure 4A:
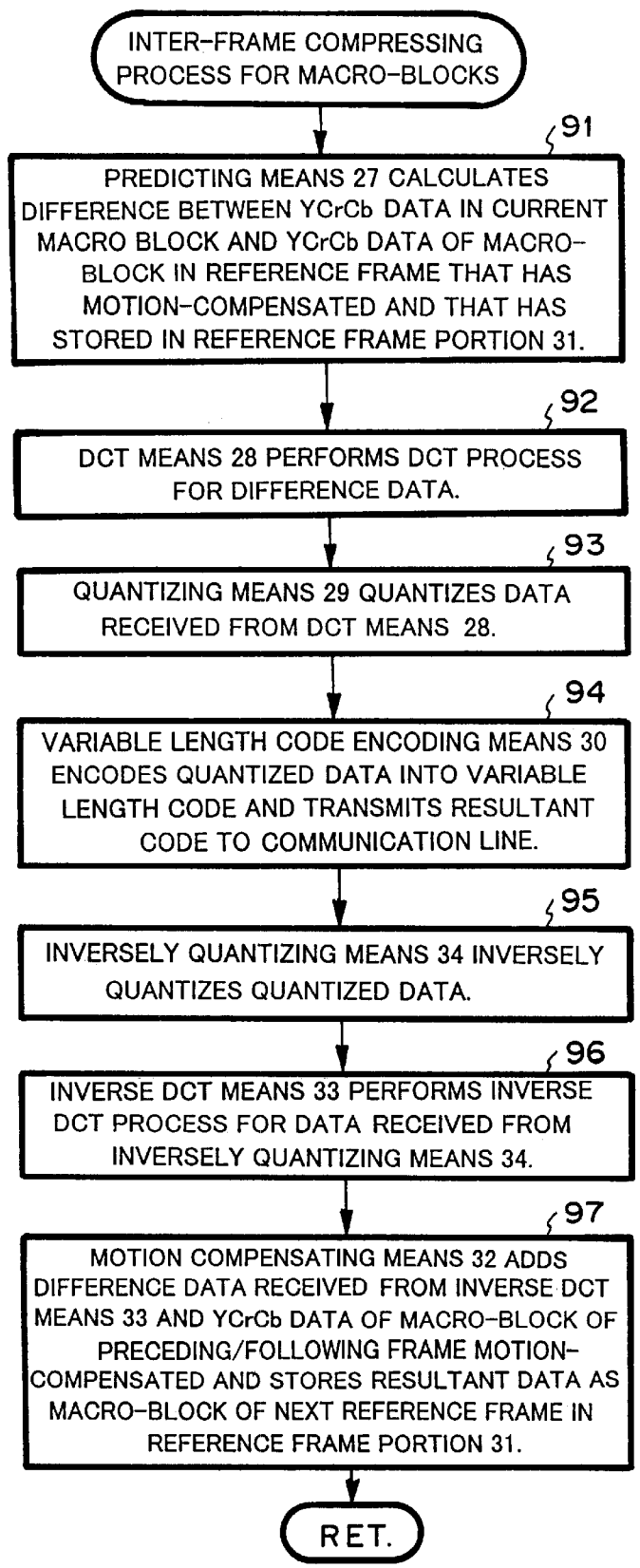

Next, with reference to flow charts shown in FIGS. 4A and 4B, the inter-frame compressing process at step 63 shown in FIG. 2C and the intra-frame compressing process at step 62 shown in FIG. 2C will be explained. In the inter-frame compressing process for a macro-block, as shown in FIG. 4A, predicting means 27 calculates the difference between YCrCb data of a current macro-block and YCrCb data of a macro-block in a reference frame that has been motion-compensated and that has been stored in reference frame portion 31 (at step 91). Thereafter, DCT means 28 performs the DCT process for the difference and obtains frequency components (at step 92). Next, quantizing means 29 quantizes the frequency components (at step 93). Variable length code encoding means 30 encodes the quantized data into variable length code and transmits the resultant code to the communication line (at step 94).

Inversely quantizing means 34 inversely quantizes the quantized data received from quantizing means 29 (at step 95). Inverse DCT means 33 performs the inverse DCT process for the data received from inversely quantizing means 34 (at step 96). Motion compensating means 32 adds difference data received from inverse DCT means 33 to YCrCb data of a macro-block of the preceding/following frame that has been motion-compensated and stores the resultant data as a macro-block of the next reference frame in the reference frame portion 31 (at step 97).

Next, with reference to a flow chart shown in FIG. 4B, the intra-frame compressing process for a macro-block will be explained. DCT means 28 performs the DCT process for YCrCb data of the current macro-block (at step 101). Quantizing means 29 quantizes frequency components and obtains quantized data (at step 102). Thereafter, variable length code encoding means 30 encodes the quantized data into variable length code and transmits the resultant code to the communication line (at step 103).

Inversely quantizing means 34 inversely quantizes the quantized data (at step 104). Inverse DCT means 33 performs the inverse DCT process for the data received from inversely quantizing means 34 (at step 105). A macro-block received from inverse DCT means 33 is stored as a macro-block of the next reference frame in reference frame portion 31 (at step 106).

Next, scene change determining process at step 51 shown in FIG. 2B will be explained. There are two kind of scene change determining process as shown in FIGS. 5A and 5B.

In the first scene change determining process shown in FIG. 5A, encoding controlling means 35 calculates the total (the total of absolute values or the square-sum) of the difference values between a macro block in the current frame and a macro block in the reference frame which is compensated corresponding to the motion of macro-blocks searched by motion estimating means 26 (at step 111). Encoding controlling means 35 determines whether or not the total of difference values exceeds a predetermined threshold value $\alpha$ (at step 112). When the determined result at step 112 is No, the flow advances to step 116. When the determined result at step 112 is Yes, encoding controlling means 35 counts up the number of macro-blocks (at step 113). Thereafter, encoding controlling means 35 determines whether or not the number of macro-blocks counted up at step 113 exceeds a predetermined threshold value $\beta$(at step 114). When the determined result at step 114 is Yes, encoding controlling means 35 determines that a scene change is taking place (at step 115).

When determined result at step 114 is No or when the determined result at step 112 is No, encoding controlling means 35 determines whether or not all the macro-blocks of the current frame have been completed (at step 116). When the determined result at step 116 is No, the flow returns to step 111. When the determined result at step 116 is Yes, encoding controlling means 35 determines that a scene change is not taking place (at step 117).

Next, with reference to the flow chart shown in FIG. 5B, the second scene change determining process will be explained. Encoding controlling means 35 compresses one macro-block so as to obtain a code amount rather than performing a real compressing process (at step 121). Encoding controlling means 35 obtains a code amount (co) and the number of macro-blocks (mn) that have been compressed (at step 122) and calculates the average code amount (cm=br/(fr×mc)) per macro-block corresponding to the frame rate (fr) of the picture data, the bit rate (br) of the communication line, and the number (mc) of macro-blocks in one frame (at step 123).

Thereafter, encoding controlling means 35 determines whether or not the ratio (co/(mn×cm)) of the real code amount (co) to the calculated average code amount (mn×cm) exceeds a predetermined threshold value $\gamma$ (at step 124). Normally, the threshold value $\gamma$ is one or greater. When the ratio (co/(mn×cm)) exceeds the threshold value $\gamma$, encoding controlling means 35 determines that a scene change is taking place(at step 125).

When the determined result at step 124 is No, encoding controlling means 35 determines whether or not all the macro-blocks of the current frame have been completed (at step 126). When the determined result at step 126 is No, the flow returns to step 121. When the determined result at step 126 is Yes, the encoding controlling means 35 determines that a scene change is not taking place (at step 127).

The threshold values $\alpha$, $\beta$, and $\gamma$ are optimum values that depend on the size of the picture, the frame rate of the picture, the bit rate of the communication line, and the performance of the compressing apparatus.

Figure 6B:
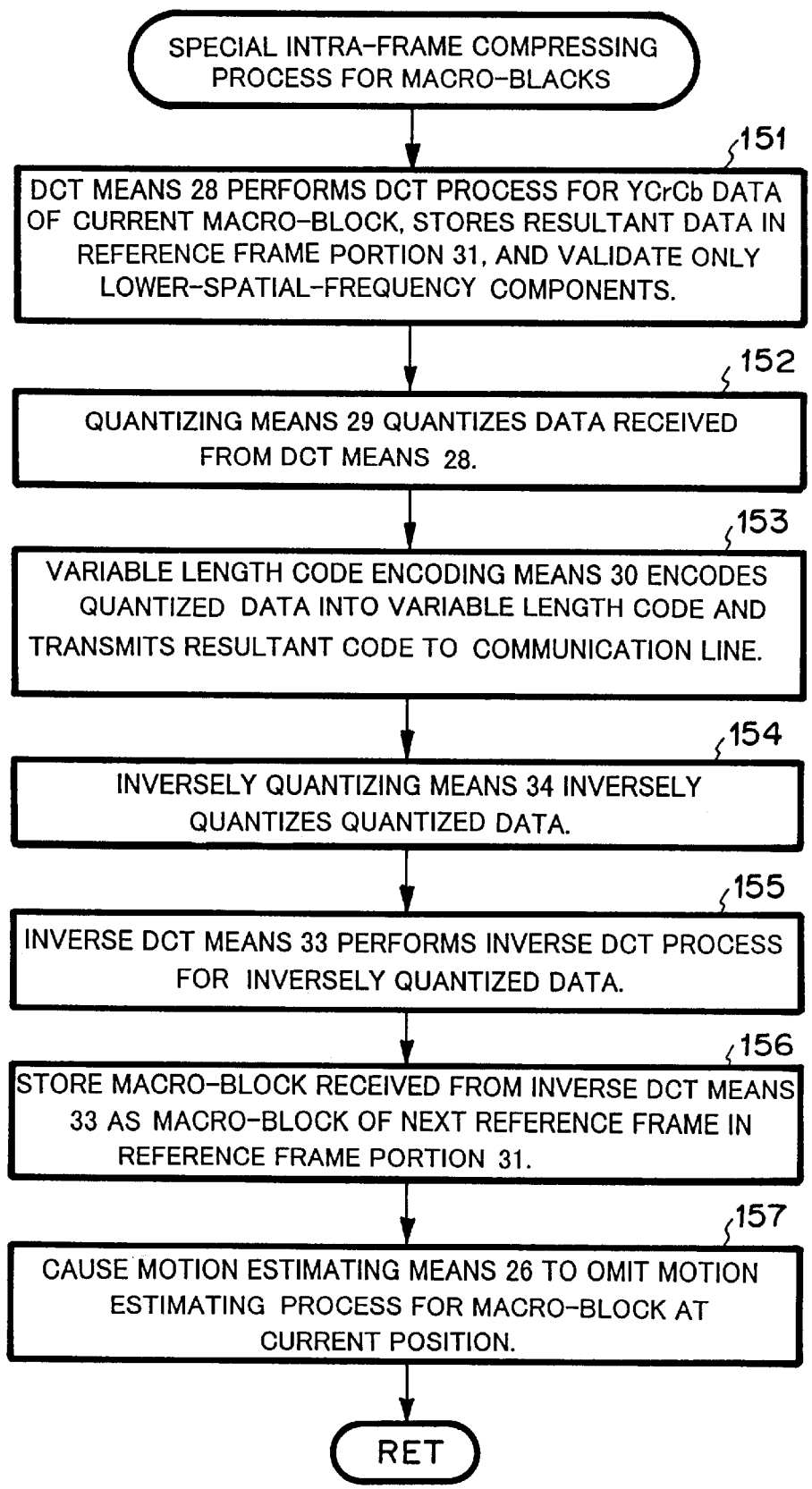
Figure 9A:
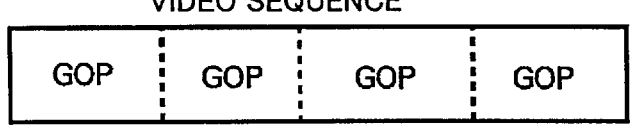
FIGS. 9A, 9B, 9C, 9D, 9E, and 9F are schematic diagrams showing a hierarchy of code formats corresponding to MPEG video standard.
Figure 9B:
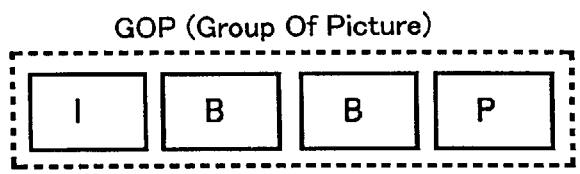
Figure 9C:
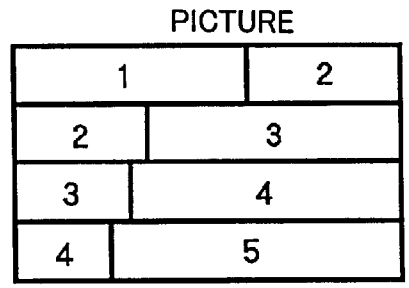
Figure 9D:
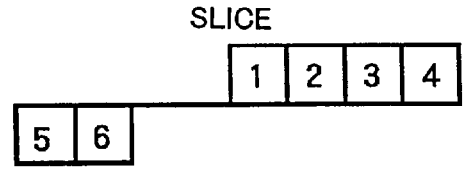
Figure 9E:
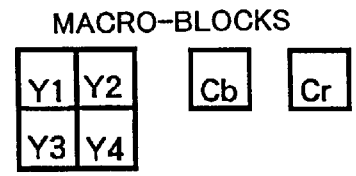
Figure 9F:
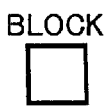
Figure 10:
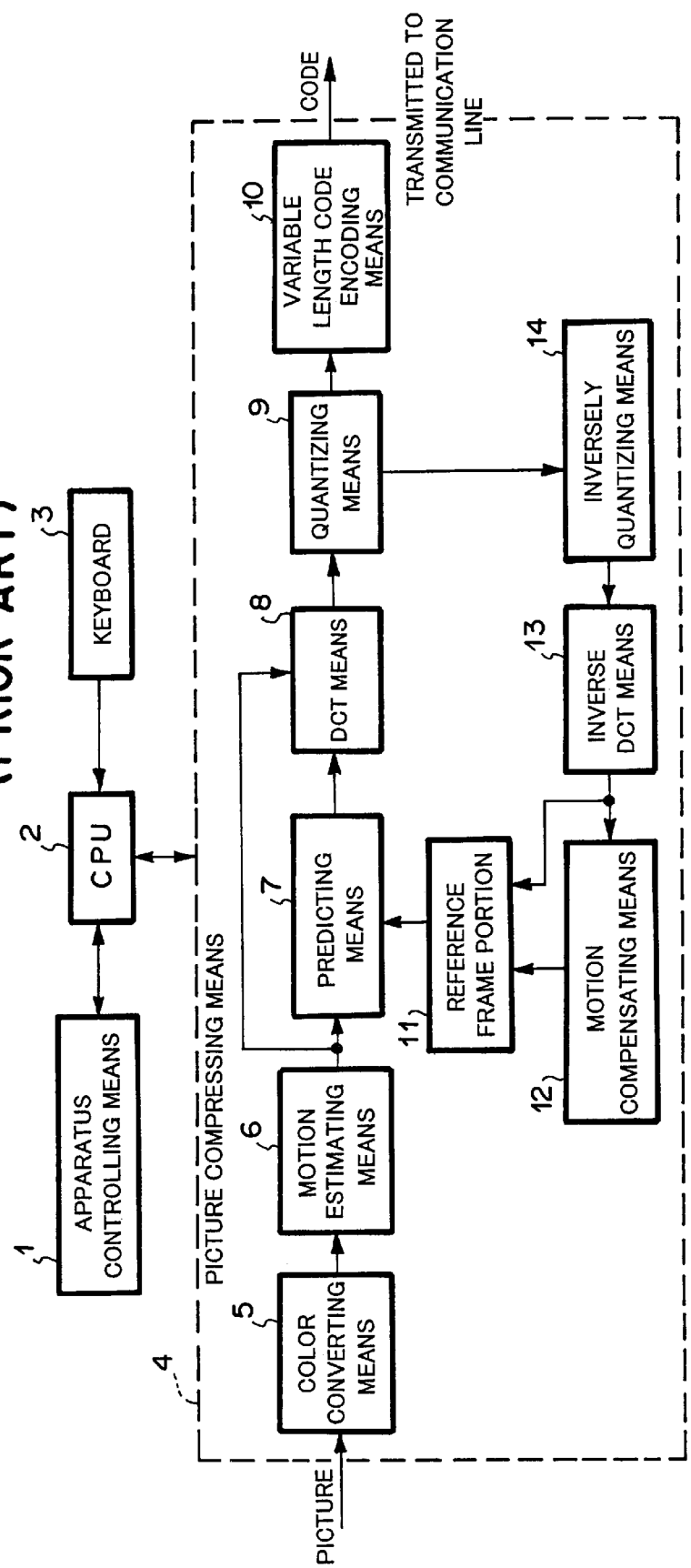
FIG. 10 is a block diagram showing an example of the structure of a conventional picture compressing apparatus.

Next, with reference to flow charts shown in FIGS. 6A and 6B, the special inter-frame compressing process at step 75 shown in FIG. 3 and the special intra-frame compressing process at step 74 shown in FIG. 3 will be explained, respectively.

In the special inter-frame compressing process for macro-blocks, frequency components that were outputted from DCT means 28 when the special intra-frame compression was executed and have been stored in reference frame portion 31 since then are read out from reference frame portion 31 and spacial frequency components included in wider band than the preceding frame are validated and processed by inverse DCT means 33 to generate a macro block regarded as the current macro-block (hereinafter referred to as the pseudo current macro-block) (at step 131). Thereafter, predicting means 27 calculates the difference between YCrCb data of the pseudo current macro-block and YCrCb data of a macro-block at the same position in the reference frame stored in reference frame portion 31 (at step 132).

Thereafter, DCT means 28 performs the DCT process for the difference data calculated at step 132 (at step 133). Quantizing means 29 quantizes data received from DCT means 28 and obtains quantized data (at step 134). Variable length code encoding means 30 encodes the quantized data into variable length code and transmits the resultant code to the communication line (at step 135). Inversely quantizing means 34 inversely quantizes the quantized data (at step 136).

Inverse DCT means 33 performs the inverse DCT process for the inversely quantized data (at step 137). Motion compensating means 32 adds the difference data received from inverse DCT means 33 and YCrCb data of a reference macro-block of a reference frame stored in reference frame portion 31 and stores the resultant data as a macro-block of the next reference frame in reference frame portion 31 (at step 138).

Next, encoding controlling means 35 determines whether any of two conditions is satisfied (at step 129). The two conditions are that the total (the total of absolute values or the square-sum) of the difference data exceeds the threshold value b and that all the spatial frequencies are validated (at step 139). When the determined result at step 139 is Yes, encoding controlling means 35 causes motion estimating means 26 to search the motion of the macro-block at the current 25 position (at step 140). This operation triggers normal encoding process. When the determined result at step 139 is No, encoding controlling means 35 completes the special inter-frame compressing process.

The threshold value b is an optimum value that depends on the size of the picture, the frame rate of the picture, the bit rate of the communication line, and the performance of the compressing apparatus.

Next, with reference to the flow chart shown in FIG. 6B, the special intra-frame compressing process for a macro-block will be explained. DCT means 28 performs the DCT process for YCrCb data of the current macro-block. The resultant data is stored in reference frame portion 31. Thereafter, values of higher-spatial-frequency components are set to zero. Thus, only the lower-spatial-frequency components are validated (at step 151).

Thereafter, quantizing means 29 quantizes data received from DCT means 28 and obtains quantized data (at step 152). Variable length code encoding means 30 encodes the quantized data into variable length code and transmits the resultant code to the communication line (at step 153). In addition, inversely quantizing means 34 inversely quantizes the quantized data (at step 154). Inverse DCT means 33 performs the inverse DCT process for the inversely quantized data (at step 155). A macro-block consisting of the resultant data is stored as a macro-block of the next reference frame in reference frame portion 31 (at step 156). Thereafter, encoding controlling means 35 causes motion estimating means 26 to omit the motion estimating process for the macro-block at the current position (at step 157).

EXAMPLE

Next, with reference to the accompanying drawings, an example of the present invention will be explained.

FIGS. 7A, 7B, 7C, 7D, 8A, 8B, 8C, 8D, and 8E show an example of a case that a frame with a scene change is compressed. In this example, a background is not changed, while a picture of the face of a person is replaced by a picture of the face of another person in the n-th frame. Since a scene change takes place in the n-th frame, macro-blocks from the n-th frame to the (n+2)-th frame are partly compressed in the special compressing process. Macro-blocks compressed in the special compressing process are those compressed in the intra-frame compressing process in the n-th frame.

FIG. 7A shows an example of the distribution of macro-blocks that are normally or specially compressed. In FIG. 7A, one frame is composed of 96 pixels in vertical direction by 128 pixels in horizontal direction. In other words, six macro-blocks in vertical direction by eight macro-blocks in horizontal direction are arranged in one frame. In FIG. 7A, it is assumed that macro-blocks in black are specially compressed.

FIG. 7B shows valid spatial frequency components of data that has been DCT processed after a scene change. As shown in FIG. 7B, it is assumed that in the first frame, 0-th to 14-th components are valid; in the second frame, 0-th to 28-th components are valid; in the third frame, 0-th to 53-rd components are valid; and in the fourth or later frame, all the spatial frequency components are valid.

FIGS. 7C and 7D show examples of encoding macro-blocks that are specially compressed in each frame. In FIG. 7C, in the n-th frame at a scene change, the intra-frame compressing process is performed where 0-th to 14-th spatial frequency components are validated. In the next (n+1)-th frame, the inter-frame compressing process is performed by using macro-frames in the n-th frame where 0-th to 28-th spatial frequency components are validated and macro-blocks of which preceding codes are decoded.

In the next (n+2)-th frame, the inter-frame compressing process is performed by using macro-blocks in the n-th frame where 0-th to 53-rd spatial frequency components are validated and macro-blocks of which preceding codes are decoded. However, for macro-blocks 11, 12, and 45 shown in FIG. 7A, when the difference between a decoded macro-block and a macro-block having increased valid spatial frequency components is treated as 0, the normal inter-frame compressing process is performed rather than the special compressing process.

The encoded macro-blocks shown in FIG. 7D are slightly different from those shown in FIG. 7C. For macro-blocks 11, 12, and 45 shown in FIG. 7A, valid spacial frequency components are increased to those of (n+2)-th frame in the (n+1)-th frame because the difference between a decoded macro-block and a macro-block having increased valid spacial frequency components is treated as zero in the (n+2)-th frame. The inter-frame compressing process is performed with macro-blocks in the n-th frame where 0-th to 53-rd spatial frequency components are validated and macro-blocks of which the preceding codes are decoded.

Although only macro-blocks in a scene change frame which are judged to be specially compressed are specially compressed in the case of FIGS. 7C and 7D, all the macro-blocks in the scene change frame may be specially compressed.

Next, an example shown in FIGS. 8A, 8B, 8C, 8D, and 8E will be explained. FIG. 8A shows blocks of original frames. FIG. 8B shows macro-blocks $P_{ix}$ of which higher-spatial-frequency components are deleted. FIG. 8C shows macro-blocks $P'_{ix}$ of a reference frame. In the n-th frame at the scene change, the macro-blocks $P_{nA}$ in the n-th frame having 0-th to 14-th spatial frequency components are compressed in the intra-frame compressing process.

In the (n+1)-th frame, the inter-frame compressing process is performed by using the macro-block $P'_{nA}$ obtained from macro-block $P_{nA}$ and the macro-block $P_{nB}$ in the n-th frame where the 0-th to 28-th spatial frequencies are validated. In the next (n+2)-th frame, the inter-frame compressing process is performed by using the macro-block $P'_{nB}$ obtained from the macro-block PnB and the macro-block $P_{nC}$ in the n-th frame where 0-th to 53-rd spatial frequency components are validated. In the next (n+3)-th frame, the inter-frame compressing process is performed by using the macro-block $P'_{nC}$ obtained from the macro-block PnC and the macro-block Pn+3 in the (n+3)-th frame.

Thus, as shown in FIG. 8D, the special intra-frame code of the macro-block $P_{nA}$ which contains only lower-spatial-frequency components and is in the n-th frame is outputted in the n-th frame at the scene change. The special inter-frame code obtained from the macro-block $P_{nB}$ having spatial frequency range extending higher than the preceding frame and the decoded macro-block $P'_{nA}$ is outputted in the (n+1)-th frame. The special inter-frame code obtained from the macro-block $P_{nC}$ having spatial frequency range extending higher than the preceding frame and the decoded macro-block $P'_{nB}$ is outputted in the (n+2)-th frame. The inter-frame code obtained from the macro-block $P_n$+3 in the (n+3)-th frame and the decoded macro-block $P'_{nC}$ is outputted in the (n+3)-th frame.

Thus, as shown in FIG. 8E, on the reproducing side, the decoded macro-block P'$_{nA}$ is displayed in the n-th frame, the decoded macro-block P'$_{nB}$ is displayed in the (n+1)-th frame, the decoded macro-block P'$_{nC}$ is displayed in the (n+2)-th frame, and the decoded macro-block P'$_{n+3}$ is displayed in the (n+3)-th frame.

In other words, a still picture of the face of the second person is displayed in three frames while gradually increasing resolution. Thereafter, the motion of the face emerges.

According to the present invention, the code amount of a frame at a scene change can be decreased because higher-special-frequency components in macro-blocks encoded by the special intra-frame compression process is decreased. In addition, picture quality quickly recovers after the scene change without need any special means at the reproducing side because a macro-block obtained by executing inverse DCT for spatial frequency components in gradually increasing range of a macro-block in the frame at the scene change is regarded as the current macro-block and the special inter-frame compression process is executed on the macro-block regarded as the current macro-block.

Although the present invention has been shown and explained with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A moving picture compression apparatus for performing intra-frame or inter-frame compression every block in frames in a moving picture, which comprises:

means for detecting scene change in a moving picture;

means for generating code containing information on components in a transformed domain's range gradually extending as the picture advances for a block in a new scene portion of a frame at the scene change detection during plural frames from the frame at the scene change detection, wherein the information is obtained by compressing the block in the new scene portion with the intra-frame compression process in the first frame from the scene change detection, and the information is obtained by compressing the block in the new scene portion with the inter-frame compression process in the second and following frames from the scene change detection.

2. The moving picture compression apparatus as set forth in claim 1, wherein the transformed domain is a spatial frequency domain.

3. A moving picture compression apparatus for performing intra-frame or inter-frame compression every block in frames of a moving picture, which comprises:

transforming means for transforming data in space domain to data in a transformed domain;

inversely-transforming means for transforming the data in the transformed domain to data in the space domain;

scene change detecting means for detecting scene change;

a first storage for storing the data in the transformed domain;

a second storage for storing data used as reference data;

a first writing means for writing the data in the transformed domain to said first storage when the scene change is detected;

invalidating means for invalidating a part of the data in the transformed domain when the scene change is detected;

a second writing means for writing the data obtained by inversely converting data which remains valid among the data in the transformed domain to said second storage as reference data when the scene change is detected;

replacing means for replacing data in a current block by replacement data obtained by reading a part of the data in the transformed domain stored in said first storage and inversely transforming the part of the data by using said inversely-transforming means;

difference data generating means for generating difference data by subtracting reference data read from said second storage from the replacement data and supplying the difference data to said transforming means; and updating means for updating reference data in said second storage by reading reference data from said second storage, adding difference data routed said transforming means and inversely-transforming means to the read reference data to get sum data, and writing the sum data to said second reference storage;

wherein the part of the data in the transformed domain read from said first storage by replacing means is increased in range as a picture advances.

4. The moving picture compression apparatus as set forth in claim 3, which further comprises:

quantizing means for quantizing the data in the space domain;

inversely-quantizing means for inversely quantizing the quantized data in the transformed domain to obtain inversely quantized data in the transformed domain; and encoding means for coding the quantized data in the transformed domain;

wherein the output of said transforming means is supplied to said inversely-transforming means through said quantizing means and said inversely-quantizing means.

5. The moving picture compression apparatus as set forth in claim 4, wherein said encoding means generates a variable length code.

6. The moving picture compression apparatus as set forth in claim 3, wherein the transformed domain is spatial frequency domain.

7. A moving picture compression method for performing intra-frame or inter-frame compression every block in frames in a moving picture, which comprises steps of:

detecting scene change in a moving picture;

generating code containing information on components in a transformed domain's range gradually extending as the picture advances for a block in a new scene portion of a frame at the scene change detection during plural frames from the frame at the scene change detection, wherein the information is obtained by compressing the block in the new scene portion with the intra-frame compression process in the first frame from the scene change detection, and the information is obtained by compressing the block in the new scene portion with the inter-frame compression process in the second and following frames from the scene change detection.

8. The moving picture compression method as set forth in claim 7, wherein the transformed domain is a spatial frequency domain.

* * * * *